United States Patent
Tsuji

(10) Patent No.: US 7,079,029 B2
(45) Date of Patent: Jul. 18, 2006

(54) DUAL-FREQUENCY MICROWAVE SENSOR

(75) Inventor: Masatoshi Tsuji, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 138 days.

(21) Appl. No.: 10/494,437

(22) PCT Filed: Oct. 29, 2002

(86) PCT No.: PCT/JP02/11245

§ 371 (c)(1),
(2), (4) Date: Apr. 30, 2004

(87) PCT Pub. No.: WO03/038470

PCT Pub. Date: May 8, 2003

(65) Prior Publication Data

US 2004/0257228 A1    Dec. 23, 2004

(30) Foreign Application Priority Data

Oct. 30, 2001    (JP)    .............................. 2001-332700

(51) Int. Cl.
*G08B 13/18*    (2006.01)
(52) U.S. Cl. ........................ 340/552; 342/27; 342/127
(58) Field of Classification Search ........ 340/552–554; 342/27–28, 118, 127
See application file for complete search history.

(56) References Cited

U.S. PATENT DOCUMENTS

| | | | |
|---|---|---|---|
| 3,823,399 A * | 7/1974 | Yamanaka | 342/128 |
| 4,052,662 A * | 10/1977 | Rau | 324/338 |
| 4,647,913 A | 3/1987 | Pantus | 340/506 |
| 6,380,882 B1 * | 4/2002 | Hegnauer | 340/554 |
| 6,501,414 B1 * | 12/2002 | Arndt et al. | 342/27 |

FOREIGN PATENT DOCUMENTS

| | | |
|---|---|---|
| EP | 0191510 A1 | 8/1986 |
| FR | 2 267 556 | 9/1973 |
| JP | 61-215982 | 9/1986 |
| JP | 1-285884 | 11/1989 |
| JP | 8-166449 | 6/1996 |
| JP | 2000-338234 | 12/2000 |

* cited by examiner

*Primary Examiner*—Thomas Mullen
(74) *Attorney, Agent, or Firm*—Wenderoth, Lind & Ponack, L.L.P.

(57) ABSTRACT

A threshold level is set in advance that has varied signal level values of reflected waves for which an object detection signal is to be generated, where the values vary in response to a distance to the object. In regard to discriminating a phase difference of respective waves reflected from an object and the signal level of the waves reflected from that object, and obtaining two distances to an object due to fold-over error when using only the phase difference, the present invention uses the signal level of the reflected waves to judge which distance is the correct distance.

3 Claims, 5 Drawing Sheets

DUAL-FREQUENCY MICROWAVE SENSOR

TECHNICAL FIELD

The present invention concerns dual-frequency microwave sensors (hereafter "MW sensors") that are active sensors using electromagnetic waves which are lower in frequency than visible light. In particular, the present invention relates to measures for improving the reliability of object detection operations.

BACKGROUND ART

Conventionally, MW sensors are known (e.g., Japanese Laid-Open Patent Publication No. Hei 7-37176 (1995)) as one form of a crime prevention device in which microwaves are transmitted toward a protected area and, when a human body is present in the protected area, the human body (intruder) is detected by receiving the reflected waves (microwaves modulated due to the Doppler effect) from that human body.

Moreover, as one type of MW sensor, sensors are known in which a distance to an object is measured by using microwaves with two different frequencies. This type of sensor is set up so that microwaves with two different frequencies are transmitted toward a protected area, and the phase difference is detected between two IF signals based on the reflected waves of each of these. This phase difference correlates to the distance to a target (an object to be detected such as a human body). In other words, it is possible to measure the distance to the target by obtaining this phase difference. The following is a description concerning an operation for detecting the phase difference in IF signals with this type of sensor.

When the IF signals, which are based on the reflected waves of microwaves with two different frequencies, are sine waves IFout1 and IFout2 (with a phase difference corresponding to the distance to the target) as shown in FIG. 4(a), the rectangular waves A and B formed from these IF signals are as shown in FIG. 4(b). It is then possible to measure the distance to the target by detecting the phase difference (the phase difference Δt at the rising edge portion of the rectangular waves in FIG. 4(b)) between the rectangular waves A and B.

However, this type of sensor has the following issues due to the fact that the distance to the target is obtained by using only the phase difference of two IF signals. FIG. 5 shows the relationship between the absolute value of the phase difference (hereafter, simply called "phase difference") of the two IF signals of this type of sensor and the distance to the target. As shown in FIG. 5, the line indicating the relationship between the phase difference and the distance to the target is folded over at the point of a 180-degree phase difference. For this reason, two points are obtained as the distance to the target that is obtained by the detected IF signal phase difference when obtaining the distance to the target by using only the phase difference of two IF signals. In FIG. 5 for example, when the phase difference of the two IF signals is 60 degrees, distances of 5 m and 25 m are obtained as the distance to the target. That is, there is no unique relationship between the phase difference of the IF signals and the distance to the target that is obtained by using that difference, and therefore, it is impossible to accurately obtain the distance to the target by using only the IF signal phase difference. Obtaining two distances with a single phase difference in this way is generally referred to as "fold-over error."

In the case of applying this type of sensor as a crime prevention sensor, for example, when the area that is intended to be protected is of a range of 10 m, that is, when there is no need to detect for human bodies present in positions farther than 10 m away, the phase difference of the two IF signals is detected as 60 degrees in the event of a human body being present in a position 25 m away from the sensor due to the existence of the "fold-over error." In this case, there is the possibility that the sensor discriminates the distance to the target to be 5 m, and issues a false alarm in which an object detection signal is generated (alarmed).

SUMMARY OF INVENTION

The present invention has been devised in consideration of these issues. Therefore, an object of the present invention is to provide a MW sensor that, with respect to MW sensors that use two frequencies of microwaves to detect an object, can accurately discriminate the distance to the object and avoid false alarms.

In order to achieve the above object, the present invention is configured so that it can accurately discriminate the distance to the detected object by also detecting the signal level of reflected waves and by using the phase difference of the reflected waves and the signal level of the reflected waves in order to overcome the influence of the above-described fold-over error when measuring the distance to an object based on the microwaves (reflected waves) reflected by the object.

Specifically, the present invention presumes a dual-frequency microwave sensor which transmits two microwaves of different frequencies and, when an object is present in a transmission direction of the microwaves, receives reflected waves of the microwaves from the object and measures a distance to the object based on the reflected waves. The dual-frequency microwave sensor is provided with an object detection means (detector) for measuring the distance to the object based on a phase difference of the respective reflected waves and a signal level of the reflected waves from the object.

Furthermore, as provided in another embodiment, the same dual-frequency microwave sensor as presumed above is provided with an object detection means (unit) that measures the distance to the object based on a phase difference of the respective reflected waves and a signal level of the reflected waves from the object, and generates an object detection signal only when the measured distance is shorter than a predetermined distance.

As a specific configuration for carrying out an object detection signal generation operation in this case, a threshold level is set in advance (i.e., before a distance to an object is measured) that has varied signal level values of reflected waves for which an object detection signal is to be generated, where the values vary in response to a distance to the object, and the object detection means is configured to generate the object detection signal only when the received reflected waves are of a signal level that exceeds the threshold level.

With these specified items, even when two points are obtained as the distance to the object that is obtained by using the phase difference of the respective reflected waves due to fold-over error, it is possible to easily judge which of the two points is the correct distance to the object by detecting the signal level of the reflected waves from the object. For example, when the present sensor is applied as a crime prevention sensor, it is possible to easily judge whether the detected object is present inside the area that is intended to be protected or the detected object is present outside the area that is intended to be protected. In this way, it is possible to avoid false alarms and to thus achieve improved sensor reliability. FIG. 3 shows an example of the relationship between the distance to an object outdoors and the signal level of the reflected waves. As shown in FIG. 3, the signal level voltage is theoretically inversely proportional to the square of the distance to the object. For example, the signal level voltages for a distance of 5 m to the object and a distance of 25 m to the object differ by a factor of twenty or greater. By using such a phenomenon, the present invention is able to also detect the signal level of waves reflected from an object and thereby accurately measure the distance to the object.

DETAILED DESCRIPTION OF THE INVENTION

Hereinafter, embodiments of the present invention are described with reference to the appended drawings. A description is given here in regard to the case of using a MW sensor as a crime prevention sensor, in which the present invention is applied to a MW sensor that has been made capable of measuring the distance to an object to be detected (an intruder or the like) by using microwaves with two different frequencies.

Description of the Configuration of the MW Sensor

Figure 1:
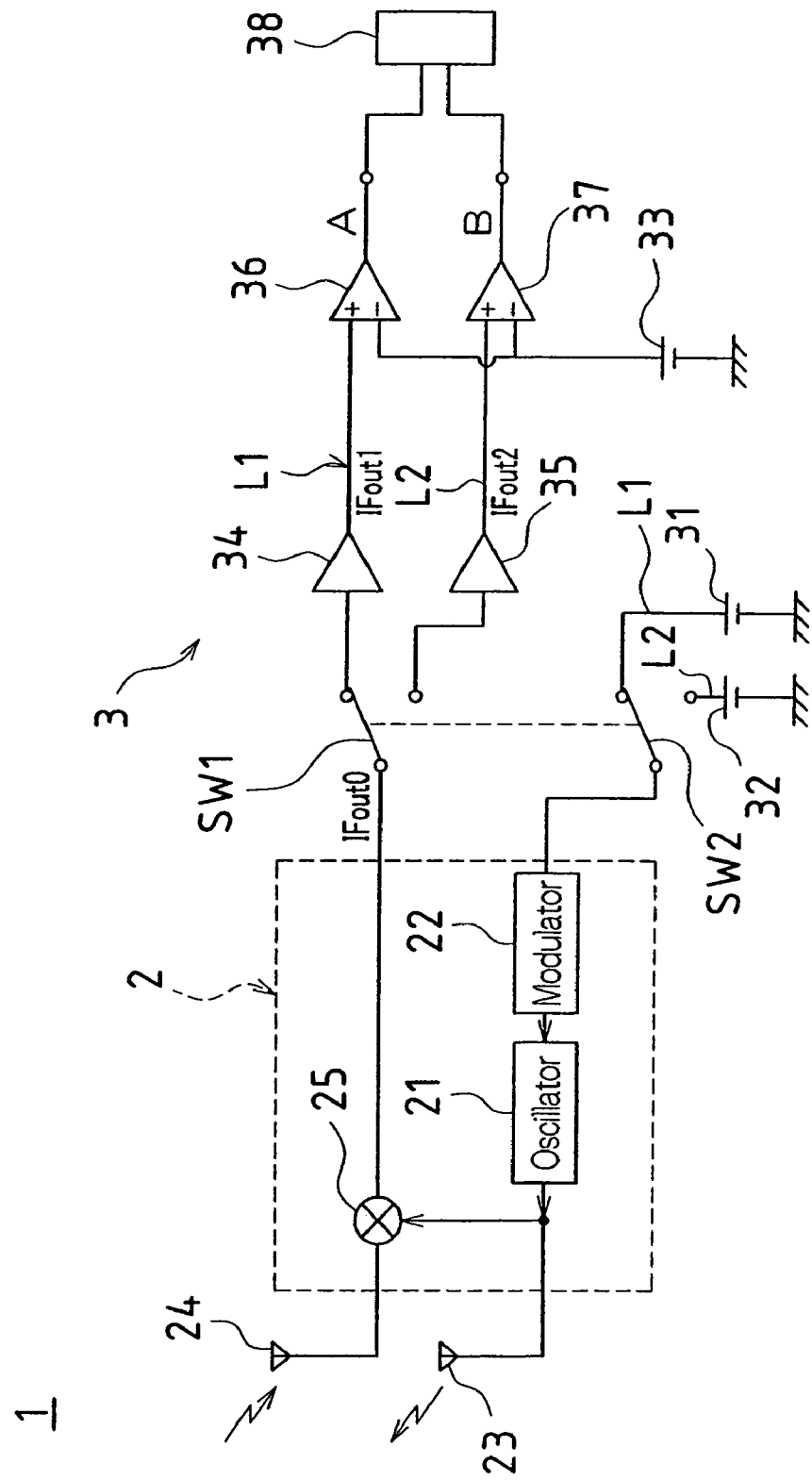
FIG. 1 is a diagram showing a circuit configuration of a MW sensor according to an embodiment of the present invention.

FIG. 1 shows a circuit configuration of a MW sensor 1 according to this embodiment. As shown in FIG. 1, the MW sensor 1 is provided with an RF module 2 and a signal processing portion 3.

The RF module 2 is provided with an oscillator 21 that produces microwaves, a modulator 22 for switching the frequencies of the microwaves produced by the oscillator 21, a transmitting antenna 23 that transmits the microwaves produced by the oscillator 21 toward a protected area, a receiving antenna 24 that receives the reflected waves of the microwaves reflected by an object such as a human body, and a mixer 25 for mixing such received microwaves together with the voltage waveforms from the oscillator 21 before output thereof. That is, when a human body or the like is present in the protected area, microwaves transmitted toward the protected area from the transmitting antenna 23 are, upon reflection by such human body or the like, modulated in frequency due to the Doppler effect before being received by the receiving antenna 24. The received reflected waves are mixed with the voltage waveforms from the oscillator 21 by the mixer 25, and are then output from the RF module 2 to the signal processing portion 3 as an IF output signal (IFout0).

On the other hand, the signal processing portion 3 is provided with a first output line L1 and a second output line L2, each corresponding to one of the microwave frequencies that are transmitted from the transmitting antenna 23. The output lines L1 and L2 are provided with power sources 31, 32, and 33, IF amplifiers 34 and 35, and comparators 36 and 37. An object distance judgment portion 38, which is one of the characteristics of the present embodiment, is arranged as an object detection means at the output side of the comparators 36 and 37.

Each of the IF amplifiers 34 and 35 is connected to the output side of the RF module 2 via a first switch SW1. The first switch SW1 is switchable in that it connects to the first output line L1 when one of the above-mentioned two frequencies of microwaves is being transmitted from the transmitting antenna 23, and connects to the second output line L2 when the other of the two frequencies of microwaves is being transmitted from the transmitting antenna 23. That is, the first switch SW1 is configured so that when one of the frequencies of microwaves is being transmitted, the IF output signal (IFout1) of the reflected waves reflected by a human body or the like is output to the first output line L1, and when the other frequency of microwaves is being transmitted, the IF output signal (IFout2) of the reflected waves reflected by a human body or the like is output to the second output line L2.

The power sources 31 and 32 are connected to the input side of the RF module 2 via a second switch SW2 that is linked to the first switch SW1. The second switch SW2 is also configured so that its connection with respect to the power sources 31 and 32 switches depending on which of the two frequencies of microwaves is being transmitted by the transmitting antenna 23. That is, the microwave frequency for the modulator 22 switches when the second switch SW2 is connected to the power source 31 on the one hand and when the second switch SW2 is connected to the power source 32 on the other hand, and in this way the microwave frequency transmitted from the transmitting antenna 23 is configured to be switchable.

In this way, in accordance with the switching operation of the switches SW1 and SW2, twp processing operations are provided. That is, a first processing operation is provided in which microwaves of one frequency are transmitted toward the protected area from the transmitting antenna 23 and the IF output signals (IFout1) based on the reflected waves thereof are output to the first output line L1 of the signal processing portion 3 for signal processing at the first output line L1. In addition, a second processing operation is provided in which microwaves of the other frequency are transmitted toward the protected area from the transmitting antenna 23 and the IF output signals (IFout2) based on the reflected waves thereof are output to the second output line L2 of the signal processing portion 3 for signal processing at the second output line L2. The first and second processing opertions are switched with predetermined time intervals (of several milliseconds for example).

These processing operations are configured so that the IF output signals that are output from the RF module 2 are then amplified by the IF amplifiers 34 and 35 and the output from the IF amplifiers 34 and 35 is output to the object distance judgment portion 38 after being formed into rectangular waves by the comparators 36 and 37.

Moreover, to describe the above-described processing operations in greater detail, when there is no human body or the like present in the protected area, the IF frequency of the output signals from the IF amplifiers 34 and 35 is "0," since the frequencies of the microwaves transmitted from the transmitting antenna 23 and of the microwaves received by the receiving antenna 24 are equal, and no signals are output from the comparators 36 and 37. In contrast to this, when a human body or the like is present in the protected area, a change is produced in the waveform of the output signals of the comparators 36 and 37, since the microwaves received by the receiving antenna 24 are modulated with respect to the frequency of the microwaves transmitted from the transmitting antenna 23, and the rectangular waves thereof are output to the object distance judgment portion 38.

Description of Object Distance Judgment Portion 38

The following is a description of the object distance judgment portion 38, which receives output signal waveforms from the comparators 36 and 37. The object distance judgment portion 38 receives output signal waveforms from the comparators 36 and 37 and discriminates the phase difference of these output signal waveforms. Furthermore, the object distance judgment portion 38 is configured to discriminate the signal level of waves reflected from the detected object. Then, based on the discriminated phase difference of the output signal waveforms and the signal level of the reflected waves, the distance to the detected object (a human body or the like) is measured, and, in response to the measured distance, a judgment is made of whether or not to generate (alarm) an object detection signal.

Specifically, a threshold level is set in advance (i.e., before a distance to an object is measured) in which the distance to the object and the signal level of the waves reflected from the object are associated, and an object detection signal is generated (alarmed) by the object distance judgment portion 38 only when there is a condition in which the received level of waves reflected from the detected object that is assumed to be present in the area that is intended to be protected (of a range of 10 m) exceeds the threshold level for that distance.

Figure 2:
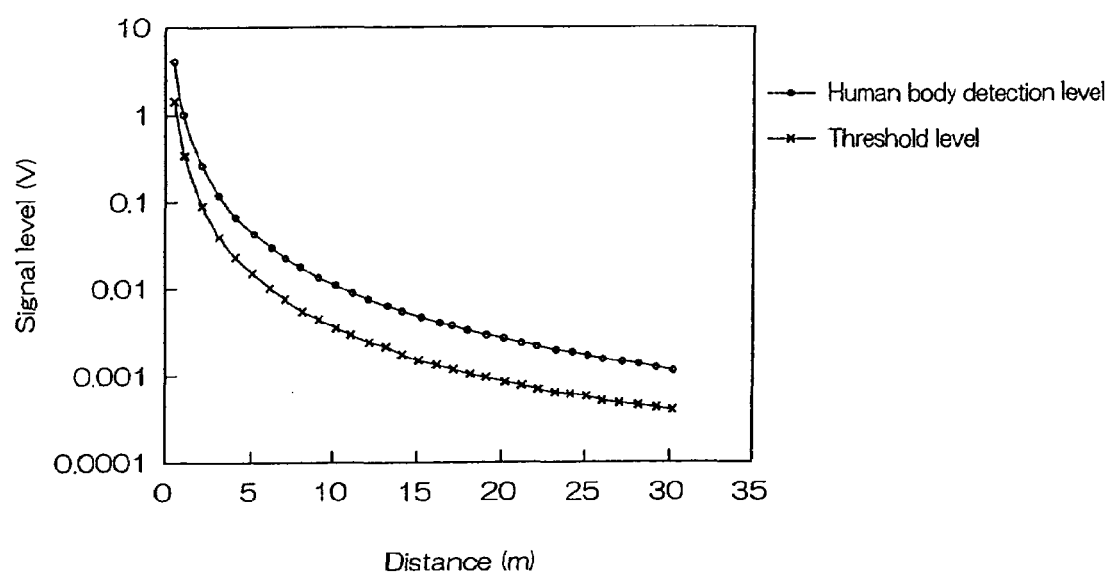
FIG. 2 is a diagram showing a threshold level according to the embodiment.
Figure 3:
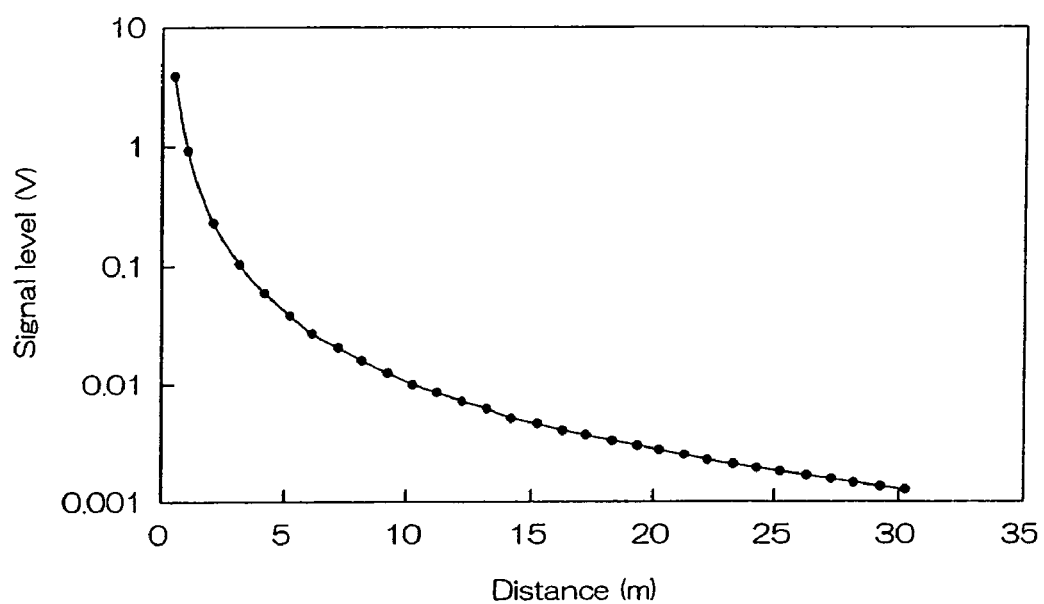
FIG. 3 is a diagram showing the relationship between the distance to a detected object and the signal level of the reflected waves.
Figure 4:
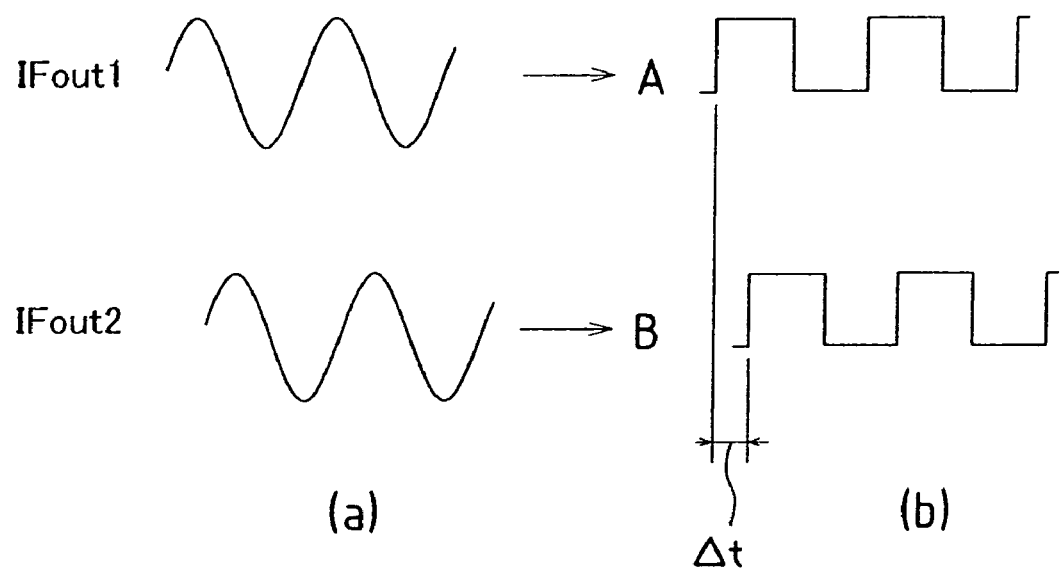
FIG. 4 is a diagram showing a conventional example of IF signals and the rectangular waves obtained from these.

As shown in FIG. 2, the threshold level is set so that the signal level by which an object detection judgment is made becomes progressively smaller for longer distances to the detected object. It should be noted that the threshold level is set in response to such factors as the installation environment of the sensor and the directivity of the receiving antenna. Furthermore, the threshold level is set as a value that is approximately one-third of the human body detection level, and is stored in a storage device (memory) that is not shown in the drawings.

By setting the threshold level in this way, when the phase difference of the two IF signals is 60 degrees, for example, 5 m and 25 m are obtained as the distance to the target (see FIG. 5), but whether the distance to the target is 5 m or 25 m is judged at this time by discriminating the signal level of the reflected waves. This makes it possible to accurately determine whether or not an object detection signal should be generated (alarmed).

Specifically, with the above-described conditions, when it is assumed that a detected object is present in the area that is intended to be protected (of a range of 10 m), that is, assumed to be present in a position 5 m from the sensor, whether or not to transmit an object detection signal is judged by determining whether or not the signal level of the reflected waves exceeds 0.013 V That is, whether or not to transmit an object detection signal is judged by determining, in the case of the detected object being present in a position 5 m from the MW sensor 1, whether or not a reflected wave signal level has been received that exceeds the threshold level (0.013 V). Then, when the signal level of the reflected waves is 0.003 V, for example, the distance to the target is judged to be 25 m, since the signal level is lower than the threshold level. On the other hand, when the signal level of the reflected waves is 0.02 V, for example, the distance to the target is judged to be 5 m, since the signal level exceeds the threshold level. When the area that is intended to be protected is set within 10 m as described above, an object detection signal is generated only in the latter case, not the former.

As described above, in accordance with the present embodiment, it is possible to accurately discriminate the distance to the detected object by overcoming the influence of the above-described fold-over error, which has conventionally been an issue, and thus it is possible to provide the MW sensor 1 that can avoid false alarms and has a high reliability.

Other Embodiments

The above embodiment was described with regard to the case of the MW sensor 1 being used as a crime prevention sensor, but the MW sensor 1 may also be applied to uses other than as a crime prevention sensor.

Furthermore, there is no limitation to the above-described threshold level, the area that is intended to be protected, or other such factors described above, and these may be set as desired in accordance with the installation environment of the MW sensor 1 and other such factors.

Figure 5:
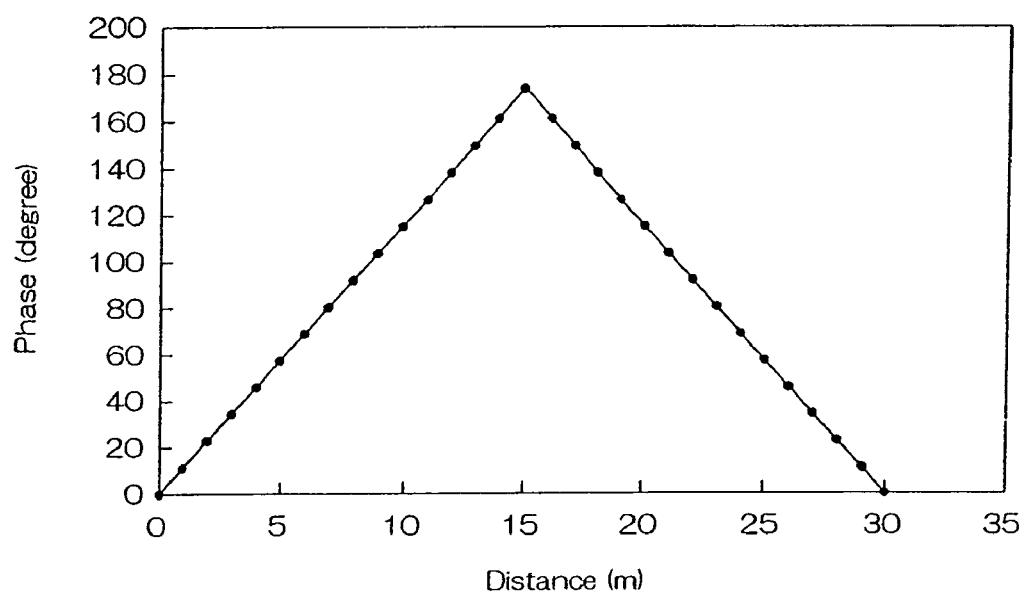
FIG. 5 is a diagram for describing fold-over error.

It should be noted that, since it is difficult to completely overcome the influence of fold-over error in the vicinity of the fold-over point (at the point of 180 degree phase difference) shown in the graph of FIG. 5, it is preferable to set the distance to an object that corresponds to this fold-over point sufficiently far away from the range of the area that is intended to be protected.

INDUSTRIAL APPLICABILITY

As described above, the dual-frequency microwave sensor according to the present invention has a high reliability in object detection operations, and when applied as a crime prevention sensor, for example, is able to accurately judge whether or not a detected object is present in the area that is intended to be protected. Moreover, the dual-frequency microwave sensor according to the present invention is superior in that an object detection signal is generated only when a detected object is present in the area that is intended to be protected. Accordingly, the dual-frequency microwave sensor according to the present invention is useful when used in a security system.

The invention claimed is:

1. A dual-frequency microwave sensor, for transmitting two microwaves of different frequencies and, when an object is present in a transmission direction of the microwaves, receiving reflected waves of the microwaves from the object and measuring a distance to the object based on the reflected waves, said sensor comprising:

an object detection unit for measuring the distance to the object based on a phase difference of the respective reflected waves and a signal level of the reflected waves from the object.

2. A dual-frequency microwave sensor, for transmitting two microwaves of different frequencies and, when an object is present in a transmission direction of the microwaves, receiving reflected waves of the microwaves from the object and measuring a distance to the object based on the reflected waves, said sensor comprising:

an object detection unit for measuring the distance to the object based on a phase difference of the respective reflected waves and a signal level of the reflected waves from the object, and generating an object detection signal only when the measured distance is shorter than a predetermined distance.

3. The dual-frequency microwave sensor according to claim 2, wherein a threshold level is set and stored in advance in which the distance to the object and the signal level of the waves reflected from the object are associated, the threshold level becoming progressively smaller for longer distances to the object, and wherein said object detection unit is configured to generate the object detection signal only when the received reflected waves are of a signal level that exceeds the threshold level.

* * * * *